US012722639B2

(12) United States Patent
Fukui

(10) Patent No.: US 12,722,639 B2
(45) Date of Patent: Sep. 1, 2026

(54) VEHICLE CONTROL DEVICE AND VEHICLE CONTROL METHOD

(71) Applicant: TOYOTA JIDOSHA KABUSHIKI KAISHA, Toyota (JP)

(72) Inventor: Yusuke Fukui, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 36 days.

(21) Appl. No.: 18/756,340

(22) Filed: Jun. 27, 2024

(65) Prior Publication Data

US 2025/0065875 A1 Feb. 27, 2025

(30) Foreign Application Priority Data

Aug. 23, 2023 (JP) ................................ 2023-135482

(51) Int. Cl.
*B60W 30/18* (2012.01)
*B60W 40/04* (2006.01)

(52) U.S. Cl.
CPC ...... *B60W 30/18109* (2013.01); *B60W 40/04* (2013.01); *B60W 2554/4045* (2020.02); *B60W 2556/65* (2020.02); *B60W 2720/10* (2013.01)

(58) Field of Classification Search
CPC ........... B60W 30/18109; B60W 40/04; B60W 2554/4045; B60W 2556/65; B60W 2720/10; B60W 30/16; B60W 50/14; B60W 30/18163
USPC ........................................................... 701/70
See application file for complete search history.

(56) References Cited

U.S. PATENT DOCUMENTS

| | | | | |
|---|---|---|---|---|
| 9,105,190 | B2 | 8/2015 | Akiyama | |
| 9,393,960 | B2 | 7/2016 | Kodaira | |
| 9,483,945 | B2 | 11/2016 | Okita et al. | |
| 9,873,412 | B2 | 1/2018 | Moriizumi | |
| 10,793,147 | B2 | 10/2020 | Kaminade et al. | |
| 2015/0321699 | A1 * | 11/2015 | Rebhan | B60W 30/18163 701/23 |
| 2021/0061309 | A1 | 3/2021 | Kawanai | |
| 2021/0107521 | A1 | 4/2021 | Fujita et al. | |
| 2021/0107528 | A1 | 4/2021 | Fujita et al. | |
| 2021/0146956 | A1 | 5/2021 | Fujita et al. | |
| 2021/0146958 | A1 | 5/2021 | Tanaka et al. | |

(Continued)

FOREIGN PATENT DOCUMENTS

JP 2020-170278 A 10/2020

*Primary Examiner* — Scott A Reinbold
(74) *Attorney, Agent, or Firm* — Oliff PLC

(57) ABSTRACT

To enable appropriate execution of a deceleration control, provided is a control device comprising a setting unit configured to set a first vehicle ahead of an own vehicle in an adjacent, as a target that has a sign of lane change, when a state of the first vehicle and a second vehicle ahead of the first vehicle satisfy a predetermined condition, a control unit configured to execute a deceleration control, when the setting unit set the first vehicle as the target, and an acquisition unit configured to acquire an information whether or not the first vehicle starts lane change. The control unit is configured to terminate the deceleration control when the acquisition unit acquires information that the first vehicle does not start lane change, while continues the deceleration control when the acquisition unit does not acquire information that the first vehicle does not start lane change.

2 Claims, 5 Drawing Sheets

(56) References Cited

U.S. PATENT DOCUMENTS

| | | | | |
|---|---|---|---|---|
| 2021/0387619 | A1* | 12/2021 | Yatagai | B60W 30/146 |
| 2022/0289192 | A1* | 9/2022 | Akahane | B60W 10/18 |
| 2023/0306851 | A1* | 9/2023 | Mizoguchi | G08G 1/164 |
| 2024/0083454 | A1* | 3/2024 | Takeuchi | B60W 60/001 |

* cited by examiner

VEHICLE CONTROL DEVICE AND VEHICLE CONTROL METHOD

CROSS-REFERENCE TO RELATED APPLICATION

This application claims priority to Japanese Patent Application No. JP2023-135482 filed on Aug. 23, 2023, the content of which is hereby incorporated by reference in its entirety into this application.

BACKGROUND OF THE INVENTION

1. Field of the Invention

The present disclosure relates to a vehicle control device and a vehicle control method.

2. Description of the Related Art

For example, Japanese Patent Application Laid-Open (kokai) No. 2020-170278 discloses a device that predicts whether a preceding vehicle traveling in an adjacent lane ahead of an own vehicle interrupts an own lane on the basis of a detection result of a millimeter wave radar or a camera sensor capable of detecting a target existing in a front area of the own vehicle, and when it is predicted that the preceding vehicle interrupts, establishes a collision determination condition at an early timing.

The preceding vehicles traveling in the adjacent lane ahead of the own vehicle is at an edge of an angle of view of the camera sensor or the like that captures the area ahead of the own vehicle. Therefore, in some cases, the millimeter wave radar or the camera sensor cannot reliably detect a cut-in scene in which the preceding vehicle traveling in the adjacent lane suddenly changes the lane to the own lane. That is, in the device disclosed in above patent document, even if there is the preceding vehicle that has actually started the cut-in, if the preceding vehicle cannot be detected, there is a problem that the collision determination cannot be appropriately performed.

SUMMARY OF THE INVENTION

It is an object of the present disclosure to enable appropriate execution of a deceleration control for avoiding a collision by effectively acquiring the lane change of the preceding vehicle traveling in the adjacent lane.

A device according to at least one embodiment of the present disclosure is a vehicle control device. The vehicle control device comprising a tracking target vehicle setting unit configured to set a first preceding vehicle traveling ahead of an own vehicle in an adjacent lane adjacent to an own lane in which the own vehicle is traveling, as a tracking target vehicle that has a sign of performing lane change from the adjacent lane to the own lane, when a traveling state of the first preceding vehicle and a second preceding vehicle traveling in the adjacent lane ahead of the first preceding vehicle satisfy a predetermined condition, a deceleration control unit configured to execute a first deceleration control for decelerating the own vehicle at a predetermined first deceleration, when the tracking target vehicle setting unit set the first preceding vehicle as the tracking target vehicle, and a lane change information acquisition unit configured to execute a vehicle-to-vehicle communication between the own vehicle and the first preceding vehicle during execution of the first deceleration control by the deceleration control unit, and acquires a lane change information including information indicating whether or not the first preceding vehicle starts lane change to the own lane through the vehicle-to-vehicle communication. The deceleration control unit is configured to terminate the first deceleration control when the lane change information acquisition unit acquires information indicating that the first preceding vehicle does not start lane change to the own lane as the lane change information, while continue the first deceleration control when the lane change information acquisition unit does not acquire information indicating that the first preceding vehicle does not start lane change to the own lane as the lane change information.

DESCRIPTION OF THE EMBODIMENTS

Description is now given of a vehicle control device and a vehicle control method according to at least one embodiment of the present disclosure with reference to the drawings.

[Hardware Configuration]

Figure 1:
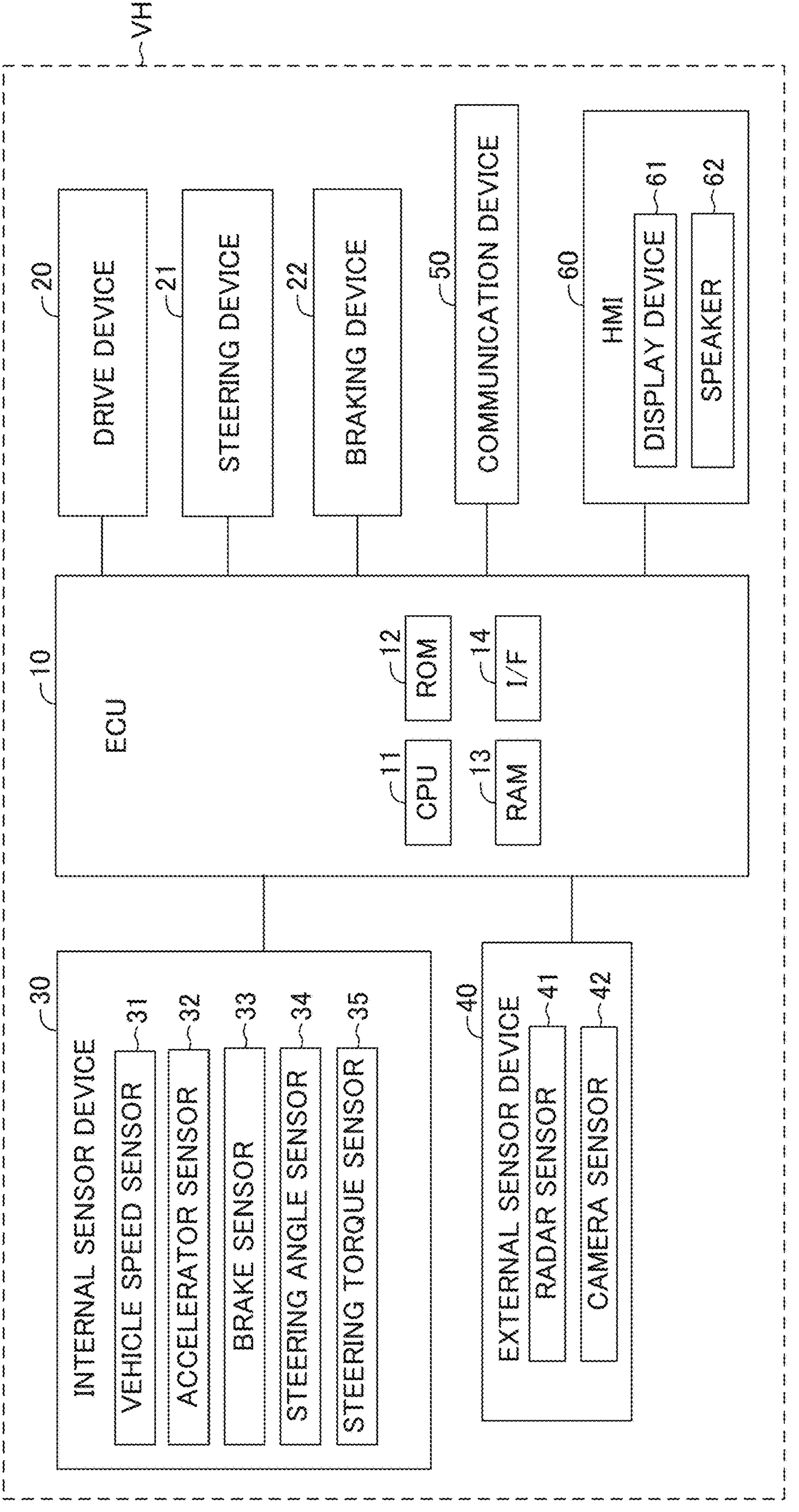
FIG. 1 is a schematic diagram showing a hardware configuration of a vehicle according to the present embodiment.

FIG. 1 is a schematic diagram of a hardware configuration of a vehicle VH to which the control device according to the present embodiment is applied. Hereinafter, the vehicle VH may be referred to as an own vehicle when it is required to distinguish it from other vehicles. Further, in the following description, a lane on which the own vehicle VH is traveling is referred to as an own lane, and a lane adjacent to the own lane and parallel to the own lane is referred to as an adjacent lane. The adjacent lane may be either the right side or the left side with respect to the own lane.

The vehicle VH has an ECU (Electronic Control Unit) 10. The ECU 10 includes a CPU (Central Processing Unit) 11, ROM (Read Only Memory) 12, RAM (Random Access Memory) 13, an interface device 14, and the like. The CPU 11 executes various programs stored in the ROM 12. The ROM 12 is a non-volatile memory that stores data and the like required for the CPU 11 to execute various programs. The RAM 13 is a volatile memory to provide a working region that is deployed when various programs are executed by the CPU 11. The interface device 14 is a communication device for communicating with an external device.

The ECU 10 is a central device which executes driving assist control of the vehicle VH, such as a collision prevention braking control described later and the like. The driving assist control is a concept which encompasses automatic driving control. A drive device 20, a steering device 21, a braking device 22, an internal sensor device 30, an external sensor device 40, a communication device 50, a HMI (Human Machine Interface) 60, and the like are communicably connected to the ECU 10.

The drive device 20 generates a driving force to be transmitted to driving wheels of the vehicle VH. As the drive device 20, for example, an engine and a motor are given. In the device according to the at least one embodiment, the vehicle VH may be anyone of a hybrid electric vehicle (HEV), a plug-in hybrid electric vehicle (PHEV), a fuel cell electric vehicle (FCEV), a battery electric vehicle (BEV), and an engine vehicle. The steering device 21 applies steering forces to steerable wheels of the vehicle VH. The braking device 22 applies a braking force to the wheels of the vehicle VH.

The internal sensor device 30 is sensors which acquire states of the vehicle VH. Specifically, the internal sensor device 30 includes a vehicle speed sensor 31, an accelerator sensor 32, a brake sensor 33, a steering angle sensor 34, a steering torque sensor 35, and the like.

The vehicle speed sensor 31 detects a travel speed (vehicle speed v) of the vehicle VH. The accelerator sensor 32 detects an operation amount of an accelerator pedal (not shown) by the driver. The brake sensor 33 detects an operation amount of a brake pedal (not shown) by the driver. The steering angle sensor 34 detects a rotational angle of a steering wheel or a steering shaft (not shown) of the vehicle VH, that is, a steering angle. The steering torque sensor 35 detects a rotational torque of a steering wheel or a steering shaft (not shown) of the vehicle VH, that is, a steering torque. The internal sensor device 30 transmits the condition of the vehicle VH detected by the sensors 31 to 35 to the ECU 10 at a predetermined cycle.

The external sensor device 40 is sensors which acquire object information on objects around the vehicle VH. Specifically, the periphery recognition device 40 includes a radar sensor 41, a camera sensor 42, and the like. As the object information, there are given, for example, a peripheral vehicle, a pedestrian, a traffic light, a white line of a road, a traffic sign, a fallen object, and the like.

The radar sensor 41 is provided in, for example, a front portion of the vehicle VH, and detects a target existing in a region located on the front side of the vehicle VH. The radar sensor 41 includes a millimeter wave radar or Lidar. The millimeter wave radar radiates a radio wave (millimeter wave) in a millimeter wave band, and receives the millimeter wave (reflected wave) reflected by a target existing within a radiation range. The millimeter wave radar acquires a relative distance between the vehicle VH and the target, a relative speed between the vehicle VH and the target, and the like based on a phase difference between the transmitted millimeter wave and the received reflected wave, an attenuation level of the reflected wave, a time from the transmission of the millimeter wave to the reception of the reflected wave, and the like. The Lidar sequentially scans laser light in a pulse form having a shorter wavelength than that of the millimeter wave in a plurality of directions, and receives reflected light reflected by a target, to thereby acquire a shape of the target detected in front of the vehicle VH, the relative distance between the vehicle VH and the target, the relative speed between the vehicle VH and the target, and the like.

The camera sensor 42 is, for example, a stereo camera or a monocular camera, and a digital camera including an image pickup element such as a CMOS sensor or a CCD sensor can be used as the camera sensor 42. The camera sensor 42 is arranged in, for example, a top portion of a front windshield glass of the vehicle VH. The camera sensor 42 captures a region in front of the vehicle VH, and processes captured image data, to thereby obtain the object information in front of the vehicle VH. The object information is information indicating a type of the target detected in front of the vehicle VH, the relative distance between the vehicle VH and the target, the relative speed between the vehicle VH and the target, and the like. It is only required to recognize the type of the target through, for example, machine learning such as pattern matching.

The external sensor device 40 repeatedly transmit the acquired object information to the ECU 10 each time a predetermined time elapses. The ECU 10 composes the relative relationship between the vehicle VH and the target acquired by the radar sensor 41 and the relative relationship between the vehicle VH and the target acquired by the camera sensor 42, to thereby determine a relative relationship between the vehicle VH and the target. It is not always required for the external sensor device 40 to include both of the radar sensor 41 and the camera sensor 42, and may include, for example, only the radar sensor 41 or only the camera sensor 42.

The communication device 50 is, for example, a communication device that performs V2V communication (vehicle-to-vehicle communication) between the own vehicle VH and the others vehicles. The communication device 50 can provide the information of the own vehicle VH to the other vehicles through vehicle-to-vehicle communication, and may further receive the information from the other vehicle. In the present embodiment, the information of the own vehicle VH includes, for example, an approach information, which will be described later. Further, the information from the other vehicle includes a response to the approach information, a steering angle, an inter-vehicle distance, blinking of a direction indicator, and the like.

The HMI 60 is an interface for inputting and outputting data between the ECU 10 and the driver, and includes an input device and an output device. Examples of the input device include a touch panel, a switch, and a sound pickup microphone. Examples of the output device include a display device 61 and a speaker 62. The display device 61 is, for example, a center display installed in an instrument panel or the like, a multi-information display, a head-up display, a display of a navigation system, or the like. The speaker 62 is, for example, a speaker of an acoustic system or the navigation system.

[Software Configuration]

Figure 2:
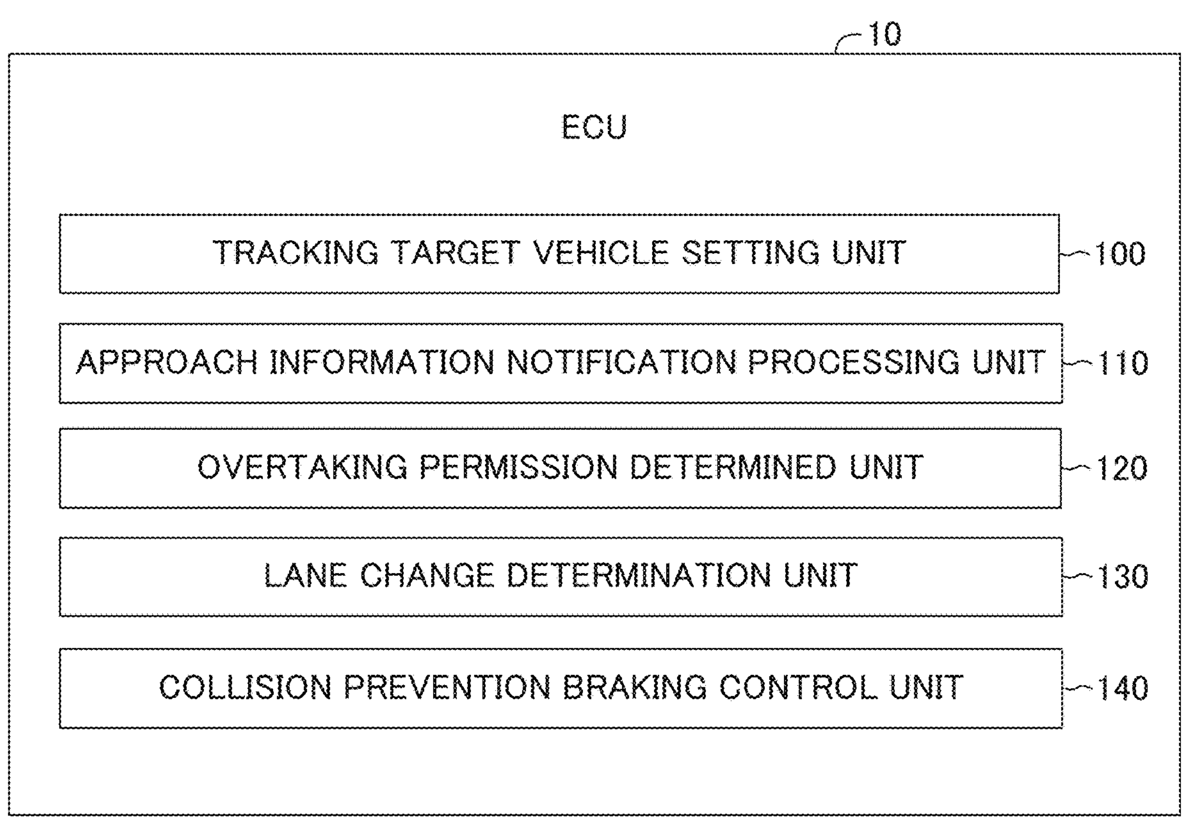
FIG. 2 is a schematic diagram showing a software configuration of a control device to the present embodiment.

FIG. 2 is a schematic diagram showing a software configuration of the ECU 10 to the present embodiment. As shown in FIG. 2, the ECU 10 includes a tracking target vehicle setting unit 100, an approach information notification processing unit 110, an overtaking permission determined unit 120 (response information acquisition unit), a lane change determination unit 130 (lane change information acquisition unit), a collision prevention braking control unit 140 (deceleration control unit), and the like as a part of functional elements. Those functional elements 100 to 140 are realized by the CPU 11 of the ECU 10 reading a program stored in the ROM 12 into the RAM 13 and executing the program. Note that all or a part of the functional elements 100 to 140 may be provided in another ECU separate from the ECU 10 or in an information processing device of a facility (a control center or the like) capable of communicating with the vehicle VH.

The tracking target vehicle setting unit 100 executes a tracking target vehicle setting process of setting the other vehicle as the tracking target vehicle when there is another vehicle in front of the own vehicle VH that has a sign (possibility) of performing lane change (cut-in) from the adjacent lane to the own lane. Hereinafter, a specific flow of the tracking target vehicle setting process will be described based on the conceptual diagram shown in FIG. 3A and the flowchart shown in FIG. 3B.

Figures 3A, 3B:
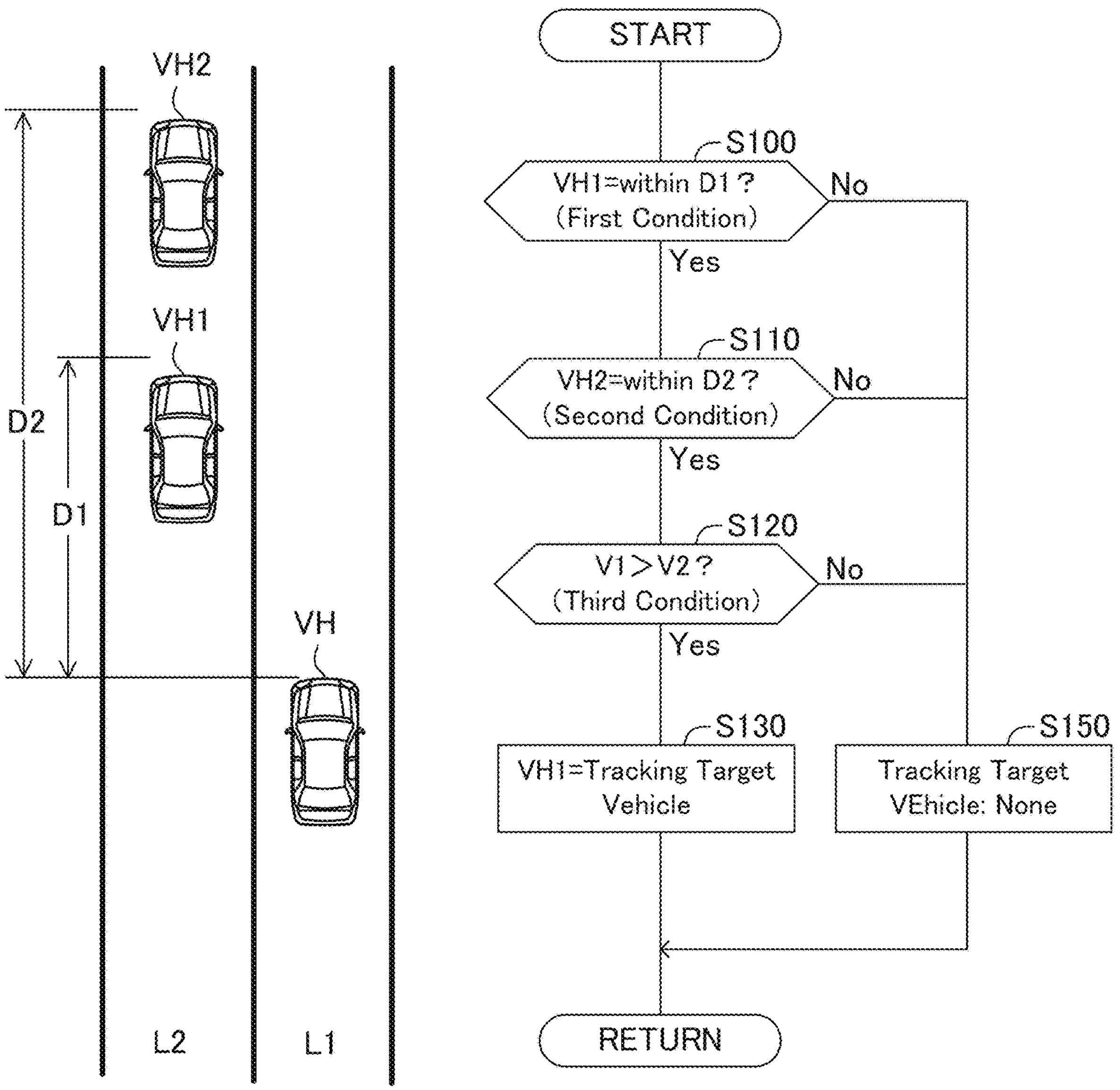
FIG. 3A is a conceptual diagram for explaining a tracking target vehicle setting process.
FIG. 3B is a flow chart for explaining a flow of the tracking target vehicle setting process.

As shown in FIG. 3A, the tracking target vehicle setting unit 100 first determines whether or not a first condition in which the first other vehicle VH1 (hereinafter, the first preceding vehicle) traveling in the adjacent lane L2 adjacent to the own lane L1 is present is satisfied within a predetermined first distance D1 in front of the own vehicle VH (refer to step S100 in FIG. 3B). The first distance D1 is not particularly limited, and examples thereof include about 20 m and the like. The first distance D1 may be a fixed value or may be a variable value according to the vehicle speed. The distance from the own vehicle VH to the first preceding vehicle VH1 may be acquired based on the detection result of the external sensor device 40. When the first condition is not satisfied, the tracking target vehicle setting unit 100 determines that there is no tracking target vehicle (refer to step S150 in FIG. 3B).

When the first condition is satisfied, that is, when the first preceding vehicle VH1 is present, the tracking target vehicle setting unit 100 determines whether or not a second condition is satisfied (refer to step S110 in FIG. 3B). Specifically, the tracking target vehicle setting unit 100 determines, as the second condition, whether or not there is a second other vehicle VH2 (hereinafter referred to as a second preceding vehicle) in front of the first preceding vehicle VH1 and traveling in the same adjacent lane L2 as the first preceding vehicle VH1 within a predetermined second distance D2 in front of the own vehicle VH. The second distance D2 is a distance longer than the first distance D1 (D2>D1). The second range D2 is not particularly limited, and may be, for example, about 50 m. The distance from the own vehicle VH to the second preceding vehicle VH2 may be acquired based on the detection result of the external sensor device 40. When the second condition is not satisfied, the tracking target vehicle setting unit 100 determines that there is no tracking target vehicle (refer to step S150 in FIG. 3B).

When both the first condition and the second condition are satisfied, that is, when the first preceding vehicle VH1 is present and the second preceding vehicle VH2 is present, the tracking target vehicle setting unit 100 determines whether or not a third condition is satisfied (refer to step S120 in FIG. 3B). Specifically, the tracking target vehicle setting unit 100 determines, as the third condition, whether or not the vehicle speed V1 of the first preceding vehicle VH1 is higher than the vehicle speed V2 of the second preceding vehicle VH2 (V1>V2). Here, the vehicle speed V1 and V2 are the speed in a longitudinal direction (a direction parallel to the vehicle front to rear direction) with respect to the ground, that is, a longitudinal speed to the ground. The vehicle speed V1 and V2 may be acquired based on the detection result of the external sensor device 40. When the third condition is not satisfied, the tracking target vehicle setting unit 100 determines that there is no tracking target vehicle (refer to step S150 in FIG. 3B).

When all of the first condition, the second condition, and the third condition are satisfied, that is, when the first preceding vehicle VH1 is present and the second preceding vehicle VH2 is present, and the vehicle speed V1 of the first preceding vehicle VH2 is faster than the vehicle speed V2 of the second preceding vehicle V2, the tracking target vehicle setting unit 100 sets the first preceding vehicle VH1 as a tracking target vehicle having a sign of a cut-in (refer to step S130 in FIG. 3B). When the first preceding vehicle VH1 is set as the tracking target vehicle, the tracking target vehicle setting unit 100 transmits the setting result to the approach information notification processing unit 110 and the collision prevention braking control unit 140.

The approach information notification processing unit 110 executes an approach information notification processing for notifying an occupant (for example, a driver) of the first preceding vehicle VH1 that the own vehicle VH is approaching from the rear, when the tracking target vehicle setting unit 100 sets the first preceding vehicle VH1 as the tracking target vehicle. Specifically, the approach information notification processor 110 transmits, to the first preceding vehicle VH1 through the communication device 50, an instruction signal for causing a display device (the center display, the multi-information display, or the like) of the preceding vehicle VH1 to display, for example, a pop-up display such as "there is an overtaking vehicle from the rear of the adjacent lane" and a confirmation button (OK button). In the first preceding vehicle VH1, when the occupant of the preceding vehicle VH1 touches the confirmation button displayed on the screen, that is, when the overtaking inquiry from the own vehicle VH is permitted, the overtaking permission flag F is turned on (F=1) to the own vehicle VH through V2V communication. Note that the approach information notification process is not limited to the display on the display device of the first preceding vehicle VH1, and may be performed by sound from the speaker. When the speaker is used, whether or not the drivers of the first preceding vehicle VH1 have permitted overtaking may be acquired by, for example, a sound collector or the like.

The overtaking permission determining unit 120 determines that the first preceding vehicle VH1 has permitted the overtaking of the own vehicle VH when it receives the turning on of the overtaking permission flag F (F=1) from the first preceding vehicle VH1 through V2V communication. On the other hand, the overtaking permission determination unit 120 determines that the first preceding vehicle VH1 does not permit the overtaking of the own vehicle VH when the overtaking permission flag F is not received even if a predetermined threshold time has elapsed from the display of the first preceding vehicle VH1 on the display device. The overtaking permission determined unit 120 transmits the determination result to the lane change determination unit 130 and the collision prevention braking control unit 140, respectively.

Figure 4:
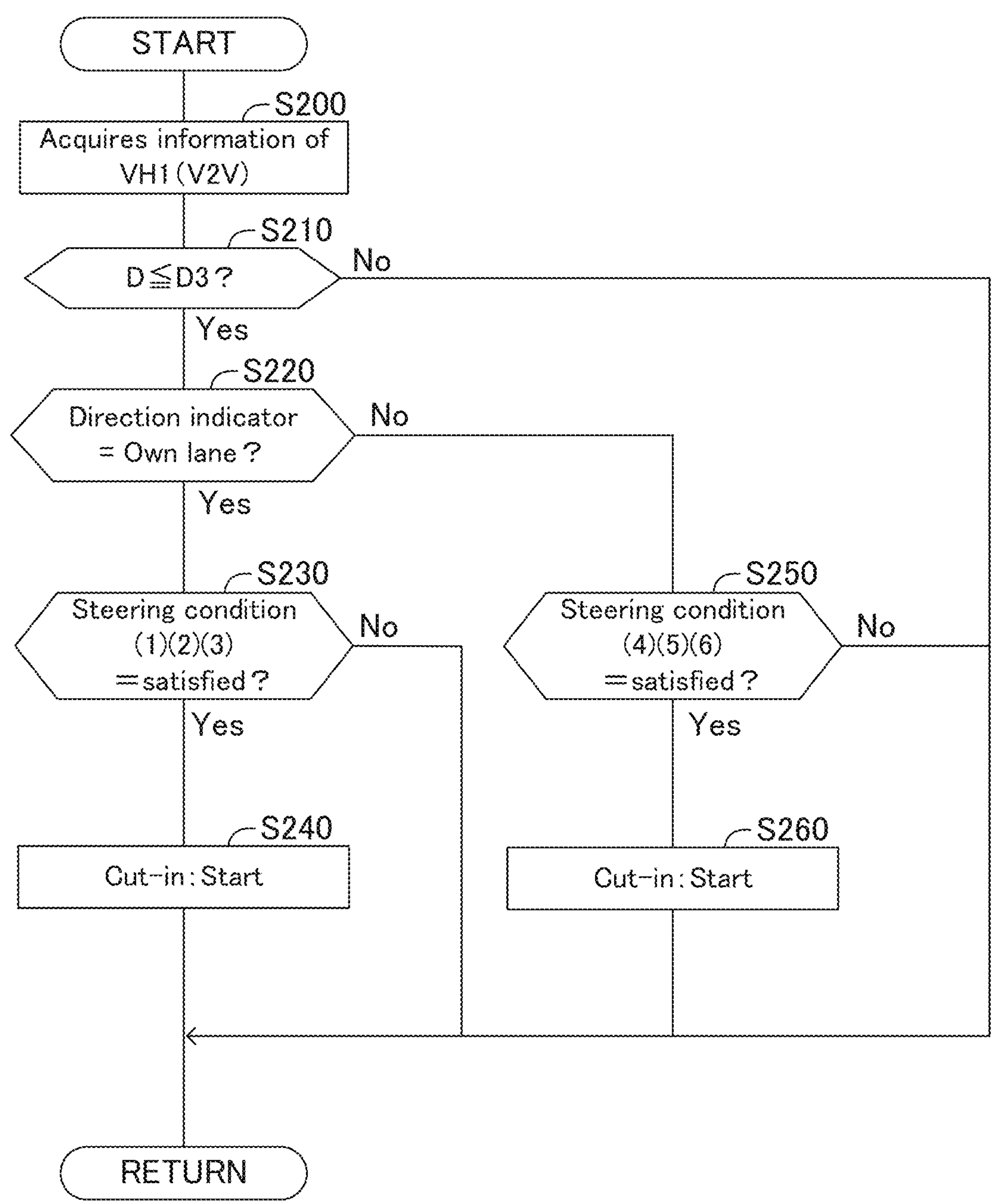
FIG. 4 is a flow chart for explaining a flow of a lane change determination process.

The lane change determination unit 130 performs a lane change determination process of determining whether the first preceding vehicle VH1 starts the lane change (cut-in) from the adjacent lane to the own lane front of the own vehicle VH when it is determined that the overtaking permission determination unit 120 does not permit the overtaking, that is, when the overtaking permission flag F is not received. Hereinafter, a specific flow of the lane change determination processing will be described based on the flowchart in FIG. 4.

The lane change determination unit 130 acquires the information of the preceding vehicle VH1 from the first preceding vehicle VH1 through V2V communication (refer to step S200). Here, the information of the first preceding vehicle VH1 includes at least the inter vehicle distance D between the first preceding vehicle VH1 and the second preceding vehicle VH2, the blinking of the directional indicator, the steering angle θ, and the steering angular velocity ω.

Next, the lane change determination unit 130 determines whether the inter vehicle distance D between the first preceding vehicle VH1 and the second preceding vehicle VH2 is equal to or less than a predetermined threshold distance D3 (refer to step S210) The threshold distance D3 is not particularly limited, and examples thereof include about 10 m. When the inter vehicle distance D is not equal to or smaller than the threshold distance D3, the lane change determination unit 130 terminates the lane change determination process (refer to step S210:No).

When the inter vehicle distance D is equal to or smaller than the threshold distance D3 (refer to step S210:Yes), the lane change determination unit 130 determines whether or not the direction indicator on the own lane is blinking among the left and right direction indicators equipped in the first preceding vehicle VH1 (refer to step S220). When the direction indicator on the own lane is blinking (refer to step S220:Yes), the lane change determination unit 130 determines whether all of the following steering conditions (1) to (3) are satisfied (refer to step S230).

Steering condition (1): the steering wheel is steered to the own lane direction.

Steering condition (2): the steering angle $\theta$ is equal to or greater than a predetermined first threshold steering angle $\theta 1$ ($\theta=\theta 1$).

Steering condition (3): the steering angular velocity $\omega$ is greater than or equal to the predetermined first threshold steering angular velocity $\omega 1$ ($\omega \geq \omega 1$).

When all of the steering conditions (1) to (3) are satisfied (refer to step S230: Yes), the lane change determination unit 130 determines that the first preceding vehicle VH1 has started the lane change (cut-in) from the adjacent lane toward the own lane (refer to step S240). On the other hand, when anyone of the steering conditions (1) to (3) is not satisfied (refer to step S230: No), the lane change determination unit 130 terminates the lane change determination process.

The lane change determination unit 130 determines whether or not all of the following steering conditions (4) to (6) are satisfied (refer to step S250 in FIG. 4) when the direction indicator on the own lane side is not blinking (refer to step S220: No).

Steering condition (4): the steering wheel is steered to the own lane direction.

Steering condition (5): the steering angle $\theta$ is equal to or greater than a predetermined second threshold steering angle $\theta 2$ ($\theta=\theta 2$).

Steering condition (6): the steering angular velocity $\omega$ is greater than or equal to the predetermined second threshold steering angular velocity $\omega 2$ ($\omega=\omega 2$).

However, the second threshold steering angle $\theta 2$ is a value larger than the first threshold steering angle $\theta 1$ ($\theta 2>\theta 1$), and the second threshold steering angular velocity $\omega 2$ is a value larger than the first threshold steering angular velocity $\omega 1$ ($\omega 2>\omega 1$).

When all of the steering conditions (4) to (6) are satisfied (refer to step S250: Yes), the lane change determination unit 130 determines that the first preceding vehicle VH1 has started the lane change (cut-in) from the adjacent lane toward the own lane (refer to step S260). On the other hand, when anyone of the steering conditions (4) to (6) is not satisfied (refer to step S250: No), the lane change determination unit 130 terminates the lane change determination process.

In the present embodiment, by effectively utilizing the information of the first preceding vehicle VH1 transmitted through V2V communication and determining whether or not the preceding vehicle VH1 has started the cut-in from the adjacent lane toward the own lane. Thus, the cut-in start of the first preceding vehicle VH1 can be effectively acquired with higher accuracy and without delay than when the detection results of the radar sensor 41 and the camera sensor 42 are used. When the lane change determination unit 130 determines that the first preceding vehicle VH1 has started the lane change from the adjacent lane toward the own lane, it transmits the determination result to the collision prevention braking control unit 140.

When the tracking target vehicle setting unit 100 sets the first preceding vehicle VH1 as the tracking target vehicle, the collision prevention braking control unit 140 activates the braking device 22 and executes a slow brake control (first deceleration control) for slowly decelerating the own vehicle VH at a predetermined first deceleration De1. The first deceleration De1 is not particularly limited, but is preferably a deceleration that is gentle enough not to give a sense of discomfort to the occupant of the own vehicle VH. In this way, when the first preceding vehicle VH1 is set to a tracking target vehicle that is likely to perform lane change (cut-in), by executing the slow braking control, it is possible to effectively reduce the risk of a collision between the own vehicle VH and the first preceding vehicle VH1.

In addition, the collision prevention braking control unit 140 terminates the slow brake control being executed when the overtaking permission determination unit 120 receives the turning on (F=1) of the overtaking permission flag F from the first preceding vehicle VH1 during the execution of the slow brake control, that is, when the driver of the first preceding vehicle VH1 permits the overtaking of the own vehicle VH. This allows the drivers of the own vehicle VH to overtake without anxiety.

On the other hand, when the overtaking permission determined unit 120 does not receive the turning on (F=1) of the overtaking permission flag F from the first preceding vehicle VH1 and the lane change determination unit 130 determines that the lane change has started during the execution of the slow brake control, the collision prevention braking control unit 140 activates the braking device 22 and executes the strong brake control (second deceleration control) for decelerating the own vehicle VH at a predetermined second deceleration De2 larger than the first deceleration De1. Although the second deceleration De2 is not particularly limited, it is preferable that the deceleration is such that the deceleration is not caused to collide with the following vehicle of the own vehicle VH. As described above, the collision between the own vehicle VH and the first preceding vehicle VH1 can effectively prevent by executing the strong brake control for decelerating own vehicle VH when the driver of the first preceding vehicle VH1 does not permit the overtaking of the own vehicle VH and the first preceding vehicle VH starts the lane change in the own lane.

After execution of the strong brake control, the collision prevention braking control unit 140 terminates the executed strong brake control when a predetermined termination condition is satisfied. The predetermined termination condition may be, for example, when the driver of the own vehicle VH performs overriding by depressing the brake pedal, or the inter vehicle distance between the own vehicle VH and the first preceding vehicle VH1 is longer than the first distance D1 (that is, when the first preceding vehicle VH1 is not the tracking target vehicle).

Figure 5:
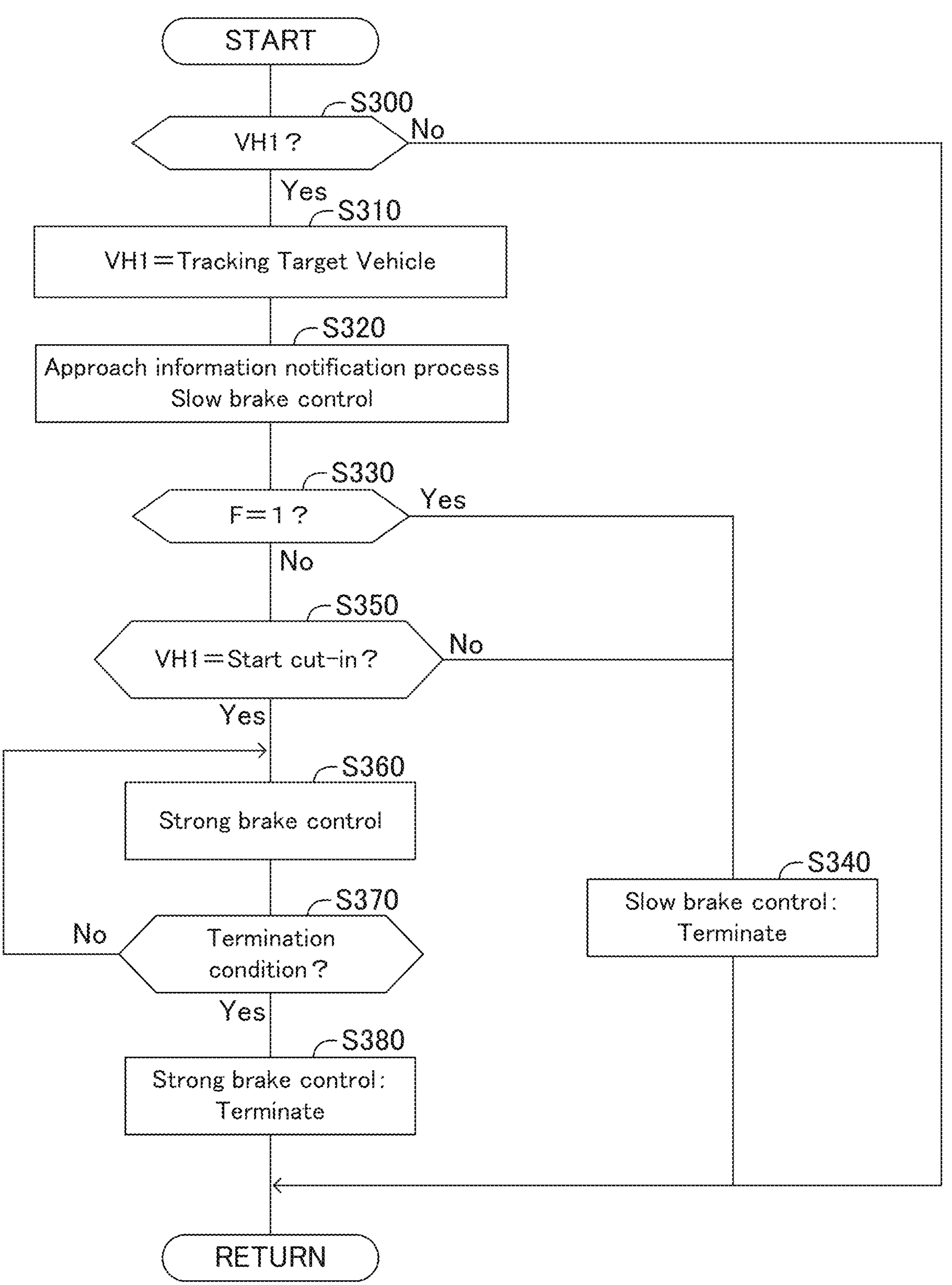
FIG. 5 is a flow chart for explaining a flow of a main control process.

Next, a routine of a main control process by the CPU 11 of the ECU 10 will be described with reference to FIG. 5. This routine is started, for example, when the own vehicle VH runs.

In step S300, the ECU 10 determines whether or not there is the first preceding vehicle VH1 that indicates (is likely to be) a lane change from the adjacent lane to the own lane. If there is the first preceding vehicle VH1 with signs of making the lane change (Yes), the ECU 10 advances the process to step S310. On the other hand, if the first preceding vehicle VH1 with signs of the lane change is not exist (No), the ECU 10 returns this routine.

In step S310, the ECU 10 sets the first preceding vehicle VH1 as the tracking target vehicle. Next, in step S320, the ECU 10 executes the approach information notification process for notifying the first preceding vehicle VH1 that the own vehicle VH is approaching from the rear through V2V communication, and also executes the slow brake control for slowly decelerating the own vehicle VH in the first deceleration De1.

In step S330, the ECU 10 determines whether or not the overtaking permission flag F is turned on (F=1) through V2V communication from the first preceding vehicle VH1. When the overtaking permission flag F is turned on (Yes), the ECU 10 advances the process to step S340, terminates the slow brake control, and returns this routine. On the other hand, when the overtaking permission flag F is not received (No), the ECU 10 advances the process to S350. That is, the slow brake control is continued.

In step S350, the ECU 10 determines whether the first preceding vehicle VH1 has started the lane change (cut-in) from the adjacent lane to the own lane based on the information of the preceding vehicle VH1 acquired from the first preceding vehicle VH1 through V2V communication. When it is determined that the first preceding vehicle VH1 has started the lane change (Yes), the ECU 10 advances the process to step S360. On the other hand, if it is not determined that the first preceding vehicle VH1 has started the lane change (No), the ECU 10 advances the process to step S340, terminates the slow brake control, and returns this routine.

In step S360, the ECU 10 executes the strong brake control to decelerate the own vehicle VH at the second deceleration De2 greater than the first deceleration De1. Next, in step S370, the ECU 10 determines whether or not the termination condition of the strong brake control is satisfied. If the termination condition is not satisfied (No), the ECU 10 returns the process to step S360 and continues the strong brake control. On the other hand, if the termination condition is satisfied (Yes), the ECU 10 advances the process to step S380, terminates the strong brake control, and returns this routine.

In the above, the vehicle control device and the vehicle control method according to the at least one embodiment have been described, but the present disclosure is not limited to the above-mentioned at least one embodiment, and various modifications are possible within the range not departing from the object of the present disclosure.

For example, in the above-described embodiment, when the turning on of the overtaking permission flag F is received from the first preceding vehicle VH1 through V2V communication (refer to step S330 in FIG. 5), the strong brake control is not executed, but when it is determined that the first preceding vehicle VH1 has started the lane change even when the turning on of the overtaking permission flag F is received, the strong brake control may be executed. Further, the braking force of the slow brake control and the strong brake control is not limited to that caused by the activation of the braking device 22, and a regenerative brake of an electric motor or the like can be used.

What is claimed is:

1. A vehicle control device comprising:

a processor, the processor configured to act as:

a tracking target vehicle setting unit configured to set a first preceding vehicle, which is traveling ahead of an own vehicle in an adjacent lane adjacent to an own lane in which the own vehicle is traveling, as a tracking target vehicle that has a sign of performing a lane change from the adjacent lane to the own lane, in response to determining that a traveling state of the first preceding vehicle and a traveling state of a second preceding vehicle traveling in the adjacent lane ahead of the first preceding vehicle satisfy a predetermined condition;

a deceleration control unit configured to execute a first deceleration control for decelerating the own vehicle at a predetermined first deceleration, in response to determining that the first preceding vehicle is set as the tracking target vehicle by the tracking target vehicle setting unit;

a lane change information acquisition unit configured to perform a vehicle-to-vehicle communication between the own vehicle and the first preceding vehicle during execution of the first deceleration control by the deceleration control unit, and configured to acquire a lane change information including information indicating whether the first preceding vehicle starts a lane change to the own lane through the vehicle-to-vehicle communication;

an approach information notification processing unit configured to execute, through the vehicle-to-vehicle communication, an approach information notification process for notifying an occupant of the first preceding vehicle of an approach information indicating that the own vehicle is approaching from the rear, in response to determining that the first preceding vehicle is set as the tracking target vehicle by the tracking target vehicle setting unit; and a response information acquisition unit configured to acquire through the vehicle-to-vehicle communication, a response information indicating that the occupant of the first preceding vehicle has confirmed the approach information, wherein the deceleration control unit is configured to terminate the first deceleration control upon determining that the lane change information indicating that the first preceding vehicle does not start a lane change to the own lane is acquired by the lane change information acquisition unit, and configured to continue the first deceleration control upon determining that the lane change information indicating that the first preceding vehicle does not start a lane change to the own lane is not acquired by the lane change information acquisition unit, and wherein the deceleration control unit is configured to terminate the first deceleration control, in response to determining that the response information is acquired by the response information acquisition unit during execution of the first deceleration control.

2. The vehicle control device according to claim 1, wherein the deceleration control unit is configured to execute a second deceleration control for decelerating the own vehicle at a predetermined second deceleration greater than the first deceleration, upon determining that the lane change information indicating that the first preceding vehicle starts a lane change to the own lane is acquired by the lane change information acquisition unit.

* * * * *